United States Patent Office 3,817,909
Patented June 18, 1974

3,817,909
LOW MODULUS ROOM TEMPERATURE
VULCANIZABLE SILICONE ELASTOMER
Louis H. Toporcer, Ingersol Township, and Irvin D. Crossan, Homer Township, Midland County, Mich., assignors to Dow Corning Corporation, Midland, Mich.
No Drawing. Filed Sept. 29, 1972, Ser. No. 293,609
Int. Cl. C08g 51/04
U.S. Cl. 260—37 SB       21 Claims

ABSTRACT OF THE DISCLOSURE

A low modulus room temperature vulcanizable silicone elastomer is obtained by mixing 100 parts by weight of a hydroxyl endblocked polydiorganosiloxane, 0 to 150 parts by weight of a non-acidic, non-reinforcing filler, 2 to 20 parts by weight of

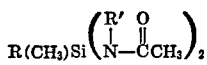

in which R is methyl, vinyl or phenyl and R' is methyl, ethyl or phenyl and 0.25 to 7 parts by weight of an aminoxysilicon compound having 3 to 10 aminoxy groups per molecule. The low modulus silicone elastomer is useful in building construction.

---

This invention relates to a room temperature vulcanizable silicone elastomer.

Aminoxysilicon compounds are known in the art as shown by U.S. Pat. No. 3,441,583 issued to Robert A. Murphy which is hereby included by reference to show the aminoxysilicon compounds and a method of their preparation. These aminoxysilicon compounds can be used as crosslinkers in silicone elastomer compositions as shown by Boissieras et al. in U.S. Pat. No. 3,359,237 and U.S. Pat. No. 3,429,847. The aminoxysilicon compounds are also known for making low modulus organopolysiloxane elastomers as described by Murphy in U.S. Pat. No. 3,341,486. Murphy describes his low modulus organopolysiloxane elastomers as being a mixture of a silanol-terminated polydiorganosiloxane and a mixture of a difunctional aminoxysilicon compound and a polyfunctional aminoxysilicon compound. Although these low modulus organopolysiloxane elastomers have many useful properties, the compositions are primarily useful as two package products. Additionally, the aminoxy organopolysiloxane compositions are not very storage stable because of scission of the polydiorganosiloxane chain. One method to reduce the chain scission problem is described by Ashby in U.S. Pat. No. 3,592,795 in which aminoxy silyl groups terminate organic polymers. However, by changing the polymer backbone from organosiloxane to organic, the resulting product is no longer a silicone elastomer but is basically an organic elastomer.

It is therefore an object of the present invention to make a storage stable room temperature vulcanizable silicone elastomer composition which cures to a low modulus silicone elastomer. This object and others will become apparent from the following detailed description.

This invention relates to a composition which is curable to a silicone elastomer at room temperature consisting essentially of the product obtained by mixing (A) 100 parts by weight of a hydroxyl endblocked polydiorganosiloxane having a viscosity at 25° C. of from 70 to 50,000 cs. and in which the organic groups are selected from the group consisting of methyl, ethyl, vinyl, phenyl and 3,3,3-trifluoropropyl radicals, in said polydiorganosiloxane no more than 50 perecnt of the organic groups being phenyl or 3,3,3-trifluoropropyl radicals, and no more than 10 percent of the organic groups being vinyl radicals, (B) 0 to 150 parts by weight of a non-acidic, nonreinforcing filler, (C) 2 to 20 parts by weight of a silane of the general formula

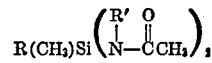

in which R is an organic radical selected from the group consisting of methyl, vinyl and phenyl and R' is an organic radical selected from the group consisting of methyl, ethyl and phenyl, (D) 0.25 to 7 parts by weight of an aminoxysilicon compound having from 1 to 100 silicon atoms per molecule and from 3 to 10 aminoxy groups per molecule, said aminoxy group having a general formula —OX in which X is a monovalent amine radical selected from the group consisting of —N''$_2$ and a heterocyclic amine, R'' is a monovalent hydrocarbon radical, the —OX group being bonded to silicon atoms through an Si—O bond, the remaining valences of the silicon atoms in the aminoxysilicon compound being satisfied by divalent oxygen atoms which link the silicon atoms of the aminoxysilicon compounds having two or more silicon atoms per molecule through silicon-oxygen-silicon bonds and by monovalent radicals selected from the group consisting of monovalent hydrocarbon radicals and halogenated monovalent hydrocarbon radicals bonded to the silicon atoms through silicon-carbon bonds and there being an average of at least one monovalent hydrocarbon radical or halogenated monovalent hydrocarbon radical per silicon atom, said aminoxysilicon compound being present in an amount which is not greater than the weight of the silane (C), the amount of said aminoxysilicon compound in said composition does not exceed 3 parts by weight wherein the viscosity of said polydiorganosiloxane at 25° C. is 8,000 cs. or less.

The hydroxyl endblocked polydiorganosiloxane (A) can have a viscosity at 25° C. of from 70 to 50,000 cs., preferably from 1,000 to 15,000 cs. The hydroxyl endblocked polydiorganosiloxanes have organic groups selected from methyl, ethyl, vinyl, phenyl and 3,3,3 - trifluoropropyl radicals. The organic groups of the polydiorganosiloxane contain no more than 50 percent phenyl or 3,3,3,-trifluoropropyl radicals and no more than 10 percent vinyl radicals based on the total number of organic radicals in the polydiorganosiloxane. Other monovalent hydrocarbon radicals and halogenated monovalent hydrocarbon radicals in small amounts can be present in the polydiorganosiloxane. The diorganosiloxane units of the hydroxyl endblocked polydiorganosiloxane can be, for example, dimethylsiloxane, diethylsiloxane, ethylmethylsiloxane, diphenylsiloxane, methylphenylsiloxane, methylvinylsiloxane and 3,3,3 - trifluoropropylmethylsiloxane. The term polydiorganosiloxane as used herein does not preclude small amounts of other siloxane units such as monoorganosiloxane units. The hydroxyl endblocked polydiorganosiloxanes are known in the art and can be made by known commercial methods. The preferred hydroxyl endblocked polydiorganosiloxane is hydroxyl endblocked polydimethylsiloxane.

The silane, (C), of the general formula

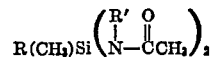

is a key ingredient of the compositions of this invention. In the formula, R represents an organic radical of the group methyl, vinyl and phenyl and R' represents an organic radical of the group methyl, ethyl and phenyl. The silanes include, for example, methylvinyldi-(N-methylacetamido)silane,
dimethyldi-(N-methylacetamido)silane,
methylphenyldi-(N-methylacetamido)silane,
methylvinyldi-(N-ethylacetamido)silane,
dimethyldi-(N-ethylacetamido)silane,
methylphenyldi-(N-ethylacetamido)silane,
methylvinyldi-(N-phenylacetamido)silane,
dimethyldi-(N-phenylacetamido)silane, and
methylphenyldi(N-phenylacetamido)silane.

These amidosilanes can be prepared by reacting a chlorosilane with an alkali metal salt of an appropriate N-organoacetamide. This method is further detailed in an application Ser. No. 293,606, entitled "Method of Preparing Amidosilanes," by Louis H. Toporcer and Irvin D. Crossan, filed on even date herewith and hereby incorporated by reference for the preparation of the amidosilanes.

The amidosilanes can be prepared, by the following illustration: mixing a sodium salt of N-methylacetamide with methylvinyldichlorosilane in an inert organic solvent such as toluene, filtering the by-produced sodium chloride from the toluene-product solution and thereafter removing the toluene by vacuum distillation to obtain the product, methylvinyldi-(N-methylacetamido)silane.

The aminoxysilicon compounds, (D), can be silicon compounds having from 1 to 100 silicon atoms per molecule in which there are from 3 to 10 aminoxy groups per molecule. The aminoxy-silicon compounds can be prepared by the method shown in U.S. Pat. No. 3,441,583 which also illustrates many amineoxysilicon compounds. The aminoxysilicon compounds include silanes and siloxanes. The aminoxy group which is bonded to the silicon atoms through silicon-oxygen bonds can be represented by the general formula —OX wherein X is a monovalent amine radical of the group —NR''$_2$ and heterocyclic amine. R'' represents a monovalent hydrocarbon radical. The —NR''$_2$ groups can be represented by N,N-diethylamino, N,N - ethylmethylamino, N,N - dimethylamino, N,N-diisopropylamino, N,N-dipropylamino, N,N-dibutylamino, N,N-dipentylamino, N,N - dihexylamino, N,N - dicyclohexylamino, N,N - methylpropylamino, N,N-methylbutylamino, N,N - diphenylamino, N,N - ditolylamino, N,N - methylphenylamino, and N,N - methylnaphthylamino. The heterocyclic amines can be illustrated by ethylenimino, pyrrolidino, piperidino and morpholino.

The aminoxysilicon compounds have 1 to 100 silicon atoms per molecule, 3 to 10 aminoxy groups per molecule and at least one monovalent hydrocarbon radical or halogenated monovalent hydrocrabon radical per silicon atom. Thus, those aminoxysilicon compounds having one silicon atom are silanes having 3 aminoxy groups and one monovalent hydrocarbon radical or halogenated monovalent hydrocarbon radical per molecule. These aminoxy silanes have a general formula R'''Si(OX)$_3$ in which R''' can be a monovalent hydrocarbon radical or halogenated monovalent hydrocarbon radical. R''' can be illustrated by methyl, ethyl, phenyl, vinyl, hexyl, octadecyl, cyclohexyl, butyl, heptyl, octyl, benzyl, phenylethyl, naphthyl, propyl, isopropyl, chlorophenyl, 3,3,3-trifluoropropyl, beta-(perfluoropentyl)ethyl, iodonaphthyl, bromoheptyl and the like.

The aminoxysilicon compounds which have more than one silicon atom per molecule can be linear polysiloxanes and cyclic polysiloxanes, for example, either homopolymers or copolymers or mixtures of the siloxanes as well as mixtures of the siloxanes and silanes. The silicon atoms of the siloxanes are linked together through silicon-oxygen-silicon bonds with the remaining valences of the silicon atoms not bonded to aminoxy groups being bonded to monovalent radicals as defined by R''' above. These aminoxy siloxanes can be illustrated by the following compounds and additional illustrations can be found in U.S. Pat. No. 3,441,583, 1,1,3-tri-(N,N - diethylamino)1,3,3-trimethyldisiloxane,

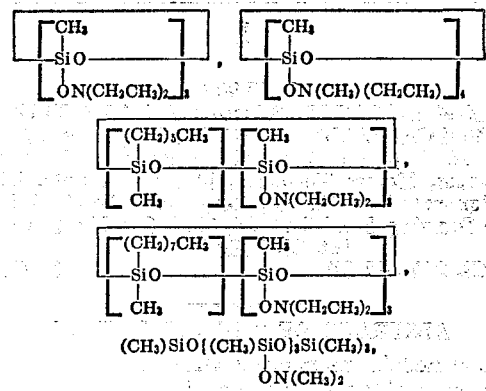

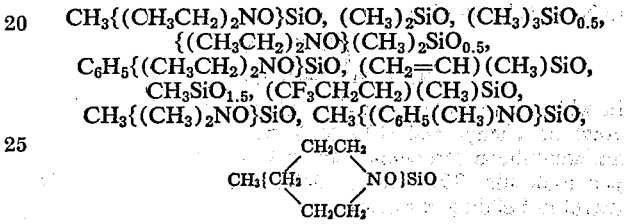

and copolymers consisting to two or more siloxane units of the following illustrative group, CH$_3${(CH$_3$CH$_2$)$_2$NO}SiO, (CH$_3$)$_2$SiO, (CH$_3$)$_3$SiO$_{0.5}$,
{(CH$_3$CH$_2$)$_2$NO}(CH$_3$)$_2$SiO$_{0.5}$,
C$_6$H$_5${(CH$_3$CH$_2$)$_2$NO}SiO, (CH$_2$=CH)(CH$_3$)SiO,
CH$_3$SiO$_{1.5}$, (CF$_3$CH$_2$CH$_2$)(CH$_3$)SiO,
CH$_3${(CH$_3$)$_2$NO}SiO, CH$_3${(C$_6$H$_5$)(CH$_3$)NO}SiO, $$CH_3\{CH_2\underset{CH_2CH_2}{\overset{CH_2CH_2}{\diagup\diagdown}}NO\}SiO$$

and the like.

The amount of amidosilane, (C) can be from 2 to 20 parts by weight per 100 parts by weight of polydiorganosiloxane. The amount of amidosilane to provide a one package silicone elastomer composition is from 5 to 20 parts by weight and this amount must be sufficient to provide at least one amidosilane molecule per silicon-bonded hydroxyl radical of the hydroxyl endblocked polydiorganosiloxane. When the amount of amidosilane is from 2 up to 5 parts by weight amidosilane, the silicone elastomer composition is a two package or two component composition, wherein one package contains the hydroxyl endblocked polydiorganosiloxane and alternatively the polydiorganosiloxane and the amidosilane and a second package contains the aminoxysilicon compound and alternatively the aminoxysilicon compound and the amidosilane. Compositions having a polydiorganosiloxane with a viscosity at 25° C. greater than 270 cs. and having from 2 up to 5 parts by weight amidosilane per 100 parts by weight polydiorganosiloxane are two package compositions. However, compositions having a polydiorganosiloxane with a viscosity at 25° C. of 270 cs. or less, the amount of amidosilane can vary from 2 to 20 parts by weight per 100 parts by weight of polydiorganosiloxane when the amount of amidosilane is such that there is less than one molecule of amidosilane per hydroxyl radical in the polydiorganosiloxane are two package compositions. The most preferred compositions have from 6 to 9 parts by weight of the amidosilane, (C), per 100 parts by weight of the hydroxyl endblocked polydiorganosiloxane. When the amount of amidosilane is less than 2 parts by weight per 100 parts by weight of (A), the resulting composition cures to a silicone elastomer with sufficiently higher modulus so that it would no longer be classified as a low modulus silicone elastomer and additionally the composition even in two package products becomes difficult to handle and result in tacky surfaces in curing. Compositions containing less than 5 parts by weight amidosilane per 100 parts by weight of (A), must be packaged as two package compositions because compositions containing all the reactive ingredients are unstable when put into one package over extended periods of time. The compositions containing from 5 to 20 parts by weight of amidosilane per 100 parts by weight of (A) can be packaged with all the reactive ingredients in one package and stored over extended periods of time under anhydrous conditions, such as for a year or more. These one package compositions must also have at least one molecule of amidosilane per hydroxyl of (A). No advantages are experienced in exceeding 20 parts by weight amidosilane per 100 parts of (A) and slower cures and less desirable physical properties are observed.

The amount of aminoxysilicon compound can be from 0.25 to 7 parts by weight per 100 parts by weight of hydroxyl endblocked polydiorganosiloxane. The amount of aminoxysilicon compound is dependent to some extent upon the viscosity of the hydroxyl endblocked polydiorganosiloxane. When the viscosity of the polydiorganosiloxane, (A), at 25° C. is 8,000 cs. or less, the amount of aminoxysilicon compound should not exceed 3 parts by weight per 100 parts by weight of (A). If the amount of aminoxysilicon compound exceeds 3 parts by weight per 100 parts by weight of (A) in compositions containing (A) of 8,000 cs. or less viscosity as measured at 25° C., the resulting cured product is a high modulus material. However, when the viscosity at 25° C. of (A) is greater than 8,000 cs., the amount of aminoxysilicon compound can vary from 0.25 to 7 parts by weight per 100 parts by weight of (A). If the amount of aminoxysilicon compound exceeds 7 parts by weight per 100 parts by weight of (A), the resulting cured products are high modulus silicone elastomers. The preferred amount of aminoxysilicon compound is from 1 to 2 parts by weight per 100 parts by weight of (A). However, the amount of aminoxysilicon compound regardless of viscosity should not exceed the weight of the amidosilane (C). Amounts of aminoxysilicon compound exceeding the weight of silane (C) result in cured products having high modulus.

The compositions of the present invention are stable upon storage whether they are one or two package compositions. Whereas the aminoxy containing compositions defined in U.S. Pat. No. 3,341,486 have problems with chain scission, as discussed in U.S. Pat. No. 3,592,795, the presently defined compositions of this invention have no such storage problems. Although it is not completely understood why the compositions of this invention are storage stable, nevertheless, compositions containing both the amidosilane and the aminoxysilicon compounds in the defined amounts provide storage stable compositions. This storage stability is particularly important for one package compositions.

The compositions of this invention are stored under anhydrous conditions because the amidosilanes and aminoxysilicon compounds are hydrolyzable when contacted by moisture. The compositions of the present invention are also adversely effected by acidic materials and thus the ingredients used in making the compositions of this invention should be neutral or basic to litmus paper when a small amount of the particular ingredients is placed in water.

The compositions of this invention can also contain fillers. The fillers can be present in amounts of from 0 to 150 parts by weight per 100 parts by weight of (A), preferably from 10 to 125 parts by weight filler per 100 parts by weight of (A). These fillers can be any non-acidic, non-reinforcing filler and include for example, calcium carbonate, ferric oxide, non-acidic carbon black, diatomaceous earth, alumina, hydrated alumina, titanium dioxide, glass microballoons, organic fillers, resins, such as silicone resins, crushed quartz, calcium sulfate and the like. Other conventional additives can be used as long as they are neutral or basic, including pigments, dyes, antioxidants, heat stability additives, and the like.

The low modulus room temperature vulcanizable silicone elastomer compositions of this invention can be prepared by mixing the defined ingredients. Those compositions which are two package compositions can be made by mixing the hydroxyl endblocked polydiorganosiloxane and filler, if used, and using this as one package and mixing the amidosilane and the aminoxysilicon compound and using this as the second package. The aminoxysilicon compound and amidosilane are mixed under essentially anhydrous conditions and stored under essentially anhydrous conditions until cure is desired. When cure is desired, the two packages are mixed and allowed to cure.

The compositions which can be used as one package compositions are preferably made by mixing the hydroxyl endblocked polydiorganosiloxane and filler, if used, to make a mixture with the filler well dispersed. A suitable mixture can usually be obtained in one hour using commercial mixers. The resulting mixture is preferably deaired and then a mixture of the amidosilane and aminoxysilicon compound is added and mixed with the polymer and filler mixture. This mixing is done under essentially anhydrous conditions and then the resulting composition is put into containers for storage under essentially anhydrous conditions. Once these one package compositions are made, they are stable for as long as one year if the essentially moisture free conditions are maintained, but will cure to low modulus silicone elastomers when exposed to moisture at room temperature. Although the above methods of making the compositions are preferred, the methods of making these compositions are not very critical. The most significant feature is the essentially anhydrous conditions required for mixing and storage wherein either or both the amidosilanes and aminoxysilicon compounds are involved. It is also observed that the best results are obtained, if the aminoxysilicon compound is added to the hydroxyl endblocked polydiorganosiloxane (alone or in a mixture with the filler and/or other additives) either prior to adding the amidosilane or with the amidosilane as a mixture.

The compositions of this invention when cured provide elastomers having high elongation, such as, greater than 600% and values of 1,000 to 1,800% are not unusual with a modulus at 150% elongation of less than 100 pounds per square inch (p.s.i.). These low modulus silicone elastomers find utility in building construction, such as in sealing joints wherein the building materials sealed by these materials can expand and contract without breaking the seal. Another outstanding feature of the cured low modulus silicone elastomers of this invention is that the tear is of a "knotty tear." A knotty tear refers to the type of tear propagation. The propagation in materials with a knotty tear will progress at sharp angles and thus instead of tearing along the entire length of a sealed joint the tear will progress across the width, for example, instead of the length of the joint. The low modulus silicone elastomers of this invention also have unprimed adhesion to a broad spectrum of building materials. The compositions of this invention also have a rapid skin-over time which helps to keep the sealing material clean because it skins over rapidly, and dirt, which would ordinarily adhere to a tacky surface, if several hours lapse before skin over, is avoided.

The compositions of this invention also do not show chain scission of the polydiorganosiloxane as is a problem with aminoxy silicone systems of the prior art and are thus much more storage stable. The compositions of this invention are extrudable from containers directly to their use area.

The compositions of the present invention do not require a catalyst to aid in curing the compositions and it is observed that many of the conventional curing catalysts used in room temperature vulcanizable silicone elastomer compositions are detrimental to the curing of the compositions.

The following examples are presented for illustrative purposes only and should not be construed as limiting the invention which is delineated in the claims.

Preparation of Dimethyldi-(N-methylacetamido)silane

To 1,500 ml. of dry toluene in a five-liter flask equipped with a stirrer, nitrogen sweep, condenser and addition funnel, 50 g. (2.1 g. atoms) of sodium metal was added. This mixture was heated to reflux to make sodium sand and at the same time the addition of N-methylacetamide (174 g., 2.2 moles) was started. The addition of the N-methylacetamide was completed in 40 minutes with a slight change in color from yellow to light gray yellow observed. No exothermic reaction was observed but gas evolution was observed. After the addition of the N-methylacetamide, the reaction mixture was refluxed for several hours until the sodium metal had disappeared and no gas evolution was evident. The mixture was then cooled. The resulting product was a toluene suspension of the sodium salt of N-methylacetamide,

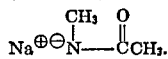

Thereafter, 129 g. of dimethyldichlorosilane was added to the toluene suspension of the sodium salt of N-methylacetamide over a 15 minute period. During this addition, the mixture was externally cooled with an ice-water bath. The mixture was then allowed to stand overnight and the by-produced sodium chloride was removed by passing the mixture through a filter containing a filter aid. The toluene was then removed by vacuum distillation and the silane product distilled wherein the maximum pot temperature was 140° C. The distilled product was 135 g. of dimethyldi-(N-methylacetamido)silane,

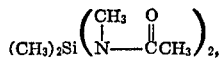

a 68% yield. The dimethydi-(N-methylacetamido)silane had a boiling point range of 87 to 92° C. at 1 mm. of Hg.

Preparation of Methylvinyldi-(N-methylacetamido)silane

A flask equipped with a stirrer, nitrogen sweep, condenser and addition funnel was charged with 300 g. of dry toluene and 250 g. of a toluene slurry of sodium salt of N-methylacetamide having 41 weight percent sodium salt of N-methylacetamide. To this slurry, 70 g. of methylvinyldichlorosilane was added over a 5 to 10 minute period while cooling with an ice-water bath. After the addition was completed, the mixture was heated to reflux and held at reflux for one hour. The resulting mixture was cooled to room temperature and passed through a filter containing filter aid to remove the by-produced sodium chloride from the solvent mixture. The salt filter cake was washed once with toluene and the wash was combined with the filtrate. The toluene was stripped from the filtrate using a Rinco evaporator to produce 99.5 g. of methylvinyldi-(N-methylacetamido)silane, a 93% yield. Analysis by gas liquid chromatography showed the product to be greater than 98% methylvinyldi-(N-methylacetamido)silane. The boiling point range was 85 to 88° C. at 1 mm. of Hg.

Preparation of Aminoxy Functional Compounds

The aminoxy functional compounds were prepared by slowly adding N,N-diethylhydroxylamine to a silicon compound precursor containing silicon-bonded hydrogen atoms including 1,3,5,7-tetramethyl-1-octyl-3,5,7-trihydrogencyclotetrasiloxane, a copolymer having per molecule an average of two trimethylsiloxane units, five methylhydrogensiloxane units and three dimethylsiloxane units and a copolymer having per molecule an average of two dimethylhydrogensiloxane units, three methylhydrogensiloxane units and five dimethylsiloxane units. The addition of the N,N-diethylhydroxylamine was continued until the hydrogen evolution was over. The reaction was done under essentially anhydrous conditions. The aminoxy products were obtained and stored until used under essentially anhydrous conditions. Methyltri-(N,N-diethylaminoxy)silane was prepared by mixing 6 moles of N,N-diethylhydroxylamine and one mole of methyltrichlorosilane. A hydrochloride salt precipitated and the aminoxysilane was decanted and recovered.

EXAMPLE 1

The following compositions were prepared by mixing the defined hydroxyl endblocked polydimethylsiloxane with the calcium carbonate filler and thereafter adding a mixture of the defined amido compound and aminoxy compound thereto and mixing the entire composition under essentially anhydrous conditions. The resulting compositions were then put into containers for storage under essentially anhydrous conditions.

A.

100 parts by weight of a hydroxyl endblocked polydimethylsiloxane having a viscosity of 4,000 cs. at 25° C.,
100 parts by weight of a commercially available calcium carbonate filler, used as received,
8 parts by weight of methylvinyldi-(N-methylacetamido)silane, and
1 part by weight of an aminoxy cyclic siloxane of the formula

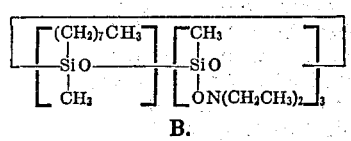

B.

100 parts by weight of the polydimethylsiloxane defined in A. above,
100 parts by weight of the same type of calcium carbonate as used in A. except dried for 48 hours at 150° C. before making this composition,
6 parts by weight of methylvinyldi-(N-methylacetamido)silane, and
1 part by weight of the aminoxy cyclic siloxane defined in A. above.

C.

Same as B. above except 8 parts by weight of methylvinyldi-(N-methylacetamido)silane was used in place of the 6 parts by weight in B.

D.

100 parts by weight of the polydimethylsiloxane defined in A. above,
45 parts by weight of a commercially available calcium carbonate filler, used as received,
6 parts by weight of methylvinyldi-(N-methylacetamido)silane,
1 part by weight of the aminoxy cyclic siloxane defined in A. above.

E.

Same as D. above except 8 parts by weight of methylvinyldi-(N-methylacetamido)silane was used in place of the 6 parts by weight in D.

F.

Same as D. above except the calcium carbonate filler was dried by heating for 48 hours at 150° C. before making the composition.

G.

Same as E. above except the calcium carbonate filler was dried by heating for 48 hours at 150° C. before making the composition.

The above compositions each had extended shelf life of the greater than one month. The properties of the above compositions were determined as follows, wherein the properties of the cured elastomers were determined on samples cured for seven days under ambient conditions. Each of the cured elastomers were low modulus elastomers. The extrusion rate was determined by Military Specification Mil-S-7502 with the results in grams per minute (gms./min.). The durometer was determined by ASTM-D-2240-64T on the Shore A scale. The tensile strength at break, elongation at break and 150% modulus were determined by ASTM-D-412 with the results in pounds per square inch (p.s.i.), percent extension and p.s.i. respectively. The tear strength, Die "B," was determined by ASTM-D-624 with the results in pounds per inch (p.p.i.). The skin-over time was determined by observing the time lapsed between the deposition of the composition with exposure to ambient moisture and the point at which the surface was dry to a light touch with a finger. The properties were as shown in Table I.

TABLE I

| Composition | Extrusion rate, gms./min. | Durometer, Shore A | Tensile strength at break, p.s.i. | Elongation at break, percent | 150% modulus, p.s.i. | Tear strength, die "B" p.p.i. | Skin over time, minutes |
|---|---|---|---|---|---|---|---|
| A | 600 | 15 | 84 | 1,050 | 69 | 19 | 50 |
| B | 280 | 15 | 95 | 1,080 | 43 | 23 | 60 |
| C | 522 | 14 | 70 | 1,100 | 61 | 20 | 60 |
| D | 308 | 14 | 100 | 1,020 | 61 | 22 | 60 |
| E | 360 | 14 | 108 | 1,215 | 48 | 23 | 60 |
| F | 276 | 18 | 129 | 1,100 | 65 | 28 | |
| G | 522 | 16 | 120 | 1,165 | 56 | 21 | |

EXAMPLE 2

The following compositions were prepared and the properties were determined as described in Example 1 and the results were as shown in Table II.

A.

100 parts by weight of a hydroxyl endblocked polydimethylsiloxane having a viscosity at 25° C. of 4,000 cs.,
110 parts by weight of a commercially available calcium carbonate dried for 48 hours at 150° C. before making this composition,
6 parts by weight of methylvinyldi-(N-methylacetamido)-silane, and
1.5 parts by weight of an aminoxy siloxane copolymer having per molecule an average of two trimethylsiloxane units, five methyl(N,N-diethylaminoxy) siloxane units and three dimethylsiloxane units.

B.

100 parts by weight of the polydimethylsiloxane defined in A. above,
110 parts by weight of the same type of calcium carbonate as shown in A. above except it was used as received,
6 parts by weight methylvinyldi-(N-methylacetamido)silane, and
3 parts by weight of the aminoxy siloxane copolymer defined in A. above.

C.

100 parts by weight of a hydroxyl endblocked polydimethylsiloxane having a viscosity at 25° C. of 2,200 cs.,
125 parts by weight of the same type of calcium carbonate as defined in B. above,
6 parts by weight of methylvinyldi-(N-methylacetamido)-silane, and
3 parts by weight of the aminoxy siloxane copolymer defined in A. above.

D.

100 parts by weight of a hydroxyl endblocked polydimethylsiloxane having a viscosity at 25° C. of 12,500 cs.,
90 parts by weight of the same type of calcium carbonate as defined in B. above,
6 parts by weight of methylvinyldi-(N-methylacetamido)-silane, and
3 parts by weight of the aminoxy siloxane copolymer defined in A. above.

E.

Same as D. above, except 4 parts by weight aminoxy siloxane copolymer in place of the 3 parts by weight.

F.

Same as D. above, except 5 parts by weight aminoxy siloxane copolymer in place of the 3 parts by weight.

G.

Same as D. above, except 6 parts by weight aminoxy siloxane copolymer in place of the 3 parts by weight.

H.

100 parts by weight of the polydimethylsiloxane as defined in A. above,
110 parts by weight of the same type of calcium carbonate filled defined in A. above having been dried for 24 hours at 150° C. before making this composition,
5 parts by weight of methylvinyldi-(N-methylacetamido)-silane, and
1 part by weight of aminoxy siloxane copolymer defined in A. above.

I.

100 parts by weight of the polydimethylsiloxane as defined in A. above,
110 parts by weight of the calcium carbonate filler as defined in H. above,
7 parts by weight of methylvinyldi-(N-methylacetamido)-silane, and
0.6 part by weight of the aminoxy siloxane copolymer defined in A. above.

J.

Same as I. above, except 125 parts by weight of the calcium carbonate filler used as received was used in place of the 110 parts by weight of the dried filler.

K.

100 parts by weight of the polydimethylsiloxane as defined in A. above,
110 parts by weight of the same type of calcium carbonate filler defined in A., dried 72 hours at 150° C. before making this composition,
7 parts by weight of methylvinyldi-(N-methylacetamido)-silane, and
1 part by weight of the aminoxy siloxane copolymer defined in A. above.

L.

Same as K. above, except 1.5 parts by weight of the aminoxy siloxane copolymer was used in place of the 1 part by weight.

M.

Same as L. above, except 2.0 parts by weight of the aminoxy siloxane was used in place of the 1.5 parts by weight.

N.

Same as K. above, except 8 parts by weight of methylvinyldi-(N-methylacetamido)silane was used in place of 7 parts by weight.

O.

Same as N. above, except 1.5 parts by weight of the aminoxy siloxane copolymer was used in place of the 1.0 parts by wegiht.

P.

Same as O. above, except 2.0 parts by weight of the aminoxy siloxane copolymer was used in place of the 1.5 parts by weight.

Q.

100 parts by weight of a hydroxyl endblocked polydimethyl-siloxane having a viscosity at 25° C. of 80 cs., 100 parts by weight of a commercially available calcium carbonate filler used as received,
14 parts by weight of methylvinyldi-(N-methylacetamido)-silane, and
1 part by weight of the aminoxy siloxane copolymer as defined in A. above.

TABLE II

| Composition | Extrusion rate, gms./min. | Durometer, Shore A | Tensile strength at break, p.s.i. | Elongation, percent | 150% modulus, p.s.i. | Tear strength die "B," p.p.i. | Skin-over time, minutes | Accelerated shelf life after 2 weeks at 70° C. Extrusion rate, gms./min. | Skin-over time, minutes |
|---|---|---|---|---|---|---|---|---|---|
| A | 400 | 18 | 85 | 1,050 | 40 | 15 | 30 | 400 | 3 |
| B | | 15 | | 800 | | | | | |
| C | | 18 | | 600 | | | | | |
| D | | 12 | | 1,200 | | | | | |
| E | | 13 | | 1,200 | | | | | |
| F | | 14 | | 900 | | | | | |
| G | | 15 | | 900 | | | | | |
| H | 250 | 13 | 110 | 1,700 | | | 25 | *150 | 15 |
| I | 540 | 8 | 108 | 1,750 | 8.6 | 21 | 25 | 540 | 20 |
| J | 400 | 15 | 80 | 1,450 | 35 | 23 | 25 | 400 | 20 |
| K | 500 | 14 | 95 | 1,800 | 26 | | 25 | 500 | 25 |
| L | 650 | 15 | 93 | 1,550 | 34 | 19 | 25 | 650 | 25 |
| M | 650 | 15 | 95 | 1,600 | 30 | | 25 | 650 | 25 |
| N | 575 | 13 | 90 | 1,840 | 26 | | 25 | 575 | 25 |
| O | 600 | 15 | 142 | 1,620 | 26 | 17.5 | 25 | 600 | 25 |
| P | 620 | 14 | 115 | 1,575 | 28 | | 25 | 620 | 25 |
| Q | | 14 | 75 | 1,200 | 41 | 16 | | | |

*After one week accelerated shelf life at 70° C., extrusion rate was 250 gms./min. and the skin-over time was 20 minutes.

TABLE III

Unprimed adhesion to the indicated substrate with the percent cohesive failure shown, measured after two weeks

| Composition | Aluminum | Glass | Marble | Concrete | Wood | Anodized aluminum |
|---|---|---|---|---|---|---|
| A | 100 | 100 | 100 | 100 | | |
| H * | 100 | 100 | **0 | 100 | **0 | 100 |
| I* | 100 | 100 | **0 | 100 | **0 | 100 |
| J* | 50 | 50 | **0 | 100 | **0 | 50 |
| K | 100 | 100 | 50 | 100 | 50 | |
| L | 100 | 100 | 50 | 100 | 50 | |
| M | 100 | 100 | 50 | 100 | 50 | |
| N | 100 | 100 | 50 | 100 | 50 | |
| O | 100 | 100 | 50 | 100 | 50 | |
| P | 100 | 100 | 50 | 100 | 50 | |

* One week instead of two weeks.
** Adhesive failure, but the adhesive bond was strong.

The properties were also observed after four months storage of compositions K, L, M, N, O and P at room temperature in sealed containers to provide essentially anhydrous conditions. The properties were as shown in Table IV.

TABLE IV

| Composition | Durometer, Shore A | Tensile strength at break, p.s.i. | Elongation at break, percent | 150% modulus, p.s.i. | Tear strength die "B," p.p.i. | Skin over time, minutes |
|---|---|---|---|---|---|---|
| K | 13 | 83 | 1,750 | 22 | 25 | 20 |
| L | 14 | 72 | 1,500 | 19 | 22 | 20 |
| M | 17 | 105 | 1,375 | 26 | 21 | 20 |
| N | 13 | 78 | 1,750 | 19 | 23 | 20 |
| O | 11 | 100 | 1,725 | 19 | 23 | 20 |
| P | 16 | 122 | 1,675 | 24 | 21 | 20 |

EXAMPLE 3

A low modulus silicone elastomer composition was prepared as described in Example 1 and was the same formulation as composition L. of Example 2, except dimethyldi-(N-methylacetamido)silane was used in place of the methylvinyldi-(N-methylacetamido)silane. The properties were determined as described in Example 1 and the results were as shown in Table V.

TABLE V

| Property | No storage before measuring properties | Stored in sealed containers for 6 weeks at 70° C. before properties measured |
|---|---|---|
| Skin-over time, minutes | 65 | 60 |
| Extrusion rate, gms./min | 750 | 750 |
| Durometer, Shore A | 13 | 13 |
| Tensile strength, p.s.i | 65 | 70 |
| Elongation, percent | 900 | 1,000 |
| 150% modulus, p.s.i | 35 | 30 |
| Tear strength, die "B", p.p.i | 16 | 17 |

EXAMPLE 4

A uniform mixture of 100 parts by weight of a hydroxyl endblocked polydimethylsiloxane having a viscosity at 25° C. of about 4,000 cs. and 110 parts by weight of a dried commercially available calcium carbonate filler was prepared by mixing on a commercial mixer. To this mixture, a mixture of 8 parts by weight methylvinyldi-(N-methylacetamido)silane and 0.6 part of weight of methyltri-(N,N-diethylaminoxy)silane was added under essentially anhydrous conditions and mixed in a commercial mixer. After the mixture was prepared, it was packaged in moisture-tight containers. The composition cured when exposed to ambient air to a low modulus silicone elastomer having a durometer of 18 on the Shore A scale. The composition skined-over within 30 minutes. After storage in the moisture-tight containers for 6 months, the composition was still the same as at the beginning.

EXAMPLE 5

The following compositions were prepared as described in Example 4, the properties were determined as shown in Example 1 and the results were as shown in Table VI. Both compositions were shelf stable after two weeks at 70° C.

A.

100 parts by weight of a hydroxyl endblocked polydimethylsiloxane having a viscosity at 25° C. of 4,000 cs.
110 parts by weight of a commercially available calcium carbonate filler, used as received,
7 parts by weight of methylvinyldi-(N-methylacetamido) silane, and
1.5 parts by weight of an aminoxy siloxane copolymer having an average of two dimethyl-(N,N-diethylaminoxy)siloxane units, five dimethylsiloxane units and three methyl-(N,N-diethylaminoxy)siloxane units per molecule.

B.

Same as A. above, except 5 parts by weight of methylvinyldi-(N-methylacetamido)silane was used in place of the 7 parts by weight.

TABLE VI

| Property | Composition A | Composition B |
|---|---|---|
| Extrusion Rate, gms./min | 750 | 700 |
| Skin-over time, min | 14 | 14 |
| Durometer, Shore A | 14 | 17 |
| Tensile strength at break, p.s.i | 80 | 110 |
| Elongation at break, percent | 1,750 | 1,600 |
| 150% modulus, p.s.i | 20 | 30 |

EXAMPLE 6

The following compositions were prepared as follows unless indicated otherwise by mixing the hydroxyl endblocked polydimethylsiloxane and the filler to make one mixture and by mixing the amidosilane and the aminoxysilicon compound to make another mixture. These two mixtures were stored in separate containers and when cure was desired, they were mixed under ambient conditions. These compositions cured to low modulus silicone elastomers.

A. Component 1

100 parts by weight of a hydroxyl endblocked polydimethylsiloxane having a viscosity at 25° C. of 4,000 cs., and 110 parts by weight of a commercially available calcium carbonate used as received.

Component 2

4 parts by weight of methylvinyldi-(N-methylacetamido)-silane and 1 part by weight of the aminoxy siloxane copolymer defined in Example 2, A.

Component 1 and 2 mixed to provide a composition having a ratio of 210 parts of Component 1 to 5 parts of Component 2.

B. Component 1

Same as (A) above.

Component 2

Same as A. above, except 0.5 part by weight aminoxy siloxane copolymer in place of 1 part of weight.

Component 1 and 2 mixed to provide a composition having a ratio of 210 parts of Component 1 to 4.5 parts of Component 2.

C. Component 1

Same as (A) above.

Component 2

Same as A. above, except 0.3 part by weight aminoxy siloxane copolymer in place of 1 part by weight.

Component 1 and 2 mixed to provide a composition having a ratio of 210 parts of Component 1 to 4.3 parts of Component 2.

D. Component 1

Same as (A) above.

Component 2

3 parts by weight of methylvinyldi-(N-methylacetamido)-silane, and 1 part by weight of the aminoxy siloxane copolymer defined in Example 2, A.

Components 1 and 2 mixed to provide a composition having a ratio of 210 parts of Component 1 to 4 parts of Component 2.

E. Component 1

100 parts by weight of a hydroxyl endblocked polydimethylsiloxane having a viscosity at 25° C. of 4,000 cs.

40 parts by weight of a dried commercially available calcium carbonate filler, and 4 parts by weight of methylvinyldi-(N-methylacetamido)-silane.

Component 2

The aminoxy cyclic siloxane defined in Example 1, A.

Components 1 and 2 mixed to provide a composition having a ratio of 144 parts of Component 1 and 0.4 parts of Component 2.

F. Component 1

100 parts by weight of a hydroxyl endblocked polydimethylsiloxane having a viscosity at 25° C. of 4,000 cs. and 40 parts by weight of a commercially available calcium carbonate, used as received.

Component 2

2 parts by weight of methylvinyldi-(N-methylacetamido)-silane, and 0.6 part by weight of the aminoxy siloxane copolymer defined in Example 2, A.

Components 1 and 2 mixed to provide a composition having a ratio of 140 parts of Component 1 and 2.6 parts of Component 2.

G. Component 1

100 parts by weight of a hydroxyl endblocked polydimethylsiloxane having a viscosity at 25° C. of about 80 cs., and 40 parts by weight of a commercially available calcium carbonate filler, used as received.

Component 2

12 parts by weight of methylvinyldi-(N-methylacetamido)-silane, and 1 part by weight of the aminoxy siloxane copolymer defined in Example 2, A.

Components 1 and 2 mixed to provide a composition having a ratio of 140 parts of Component 1 and 13 parts of Component 2.

The properties were determined on cured low modulus silicone elastomer after curing for 7 days at ambient conditions. The results were determined as described in Example 1 and were as shown in Table VII.

TABLE VII

| Composition | Durometer, Shore A scale | Tensile strength at break, p.s.i. | Elongation at break, percent | 150% modulus, p.s.i. | Tear strength, die "B," p.p.i. |
|---|---|---|---|---|---|
| A | 16 |  | 1,400 |  |  |
| B | 13 |  | 1,800 |  |  |
| C | 11 |  | 1,800 |  |  |
| D | 16 |  | 1,200 |  |  |
| E | 20 | 82 | 1,270 | 43 | 25 |
| F | 18 | 145 | 1,400 | 38 | 23 |
| G | 15 | 86 | 1,190 | 34 | 15 |

That which is claimed is:

1. A composition consisting essentially of the product obtained by mixing (A) 100 parts by weight of a hydroxyl endblocked polydiorganosiloxane having a viscosity at 25° C. of from 70 to 50,000 cs. and in which the organic groups are selected from the group consisting of methyl, ethyl, vinyl, phenyl and 3,3,3-trifluoropropyl radicals, in said polydiorganosiloxane no more than 50 percent of the organic groups being phenyl or 3,3,3-trifluoropropyl radicals and no more than 10 percent of the organic groups being vinyl radicals, (B) 0 to 150 parts by weight of a non-acidic, nonreinforcing filler, (C) 2 to 20 parts by weight of a silane of the general formula

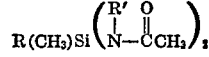

in which R is an organic radical selected from the group consisting of methyl, vinyl and phenyl and R' is an organic radical selected from the group consisting of methyl, ethyl and phenyl, (D) 0.25 to 7 parts by weight of an aminoxysilicon compound having from 1 to 100 silicon atoms per molecule and from 3 to 10 aminoxy group per molecule, said aminoxy group having a general formula —OX in which X is a monovalent amine radical selected from the group consisting of —NR''$_2$ and a heterocyclic amine, R'' is a monovalent hydrocarbon radical, the —OX group being bonded to silicon atoms through an Si—O bond, the remaining valences of the silicon atoms in the aminoxysilicon compound being satisfied by divalent oxygen atoms which link the silicon atoms of the aminoxysilicon compounds having two or more silicon atoms per molecule through silicon-oxygen-silicon bonds and by monovalent radicals selected from the group consisting of monovalent hydrocarbon radicals and halogenated monovalent hydrocarbon radicals bonded to the silicon atoms through silicon-carbon bonds and there being an average of at least one monovalent hydrocarbon radical or halogenated monovalent hydrocarbon radical per silicon atom, said aminoxysilicon compound being present in an amount which is not greater than the weight of the silane (C), the amount of said aminoxysilicon compound in said composition does not exceed 3 parts by weight wherein the viscosity of said polydioroganosiloxane at 25° C. is 8,000 cs. or less.

2. The composition in accordance with claim 1 in which the polydiorganosiloxane is a polydimethylsiloxane, R is vinyl, R' is methyl and each R" is ethyl.

3. The composition in accordance with claim 2 in which the non-acidic, non-reinforcing filler is present in an amount of from 10 to 125 parts by weight.

4. The composition in accordance with claim 3 in which the viscosity of the polydimethylsiloxane is from 1,000 to 15,000 cs. at 25° C.

5. The composition in accordance with claim 4 in which the silane (C) is present in an amount of from 6 to 9 inclusive parts by weight.

6. The composition in accordance with claim 4 in which silane (C) is present in an amount of from 2 up to 5 parts by weight per 100 parts by weight of (A) when the viscosity of the polydiorganosiloxane (A) is greater than 270 cs. at 25° C. and present in an amount of from 2 to 20 parts by weight per 100 parts by weight of (A) when the viscosity of the polydiorganosiloxane is 270 cs. at 25° C. and less and additionally there being less than one molecule of silane (C) per hydroxyl group in (A).

7. The composition in accordance with claim 5 in which the non-acidic, non-reinforcing filler is calcium carbonate.

8. The composition in accordance with claim 7 in which the aminoxysilicon compound is a linear copolymer having an average of 5 to 15 silicon atoms per molecule and having siloxane units selected from the group consisting of trimethylsiloxane units, dimethyl-(N,N-diethylaminoxy)siloxane units, methyl - (N,N - diethylaminoxy)siloxane units and dimethylsiloxane units.

9. The composition in accordance with claim 7 in which the aminoxy silicon compound is methyltri-(N,N-diethylaminoxy)silane.

10. The composition in accordance with claim 7 in which the aminoxysilicon compound is a cyclic siloxane consisting of one unit of methyloctylsiloxane and three units of methyl-(N,N-diethylaminoxy)siloxane.

11. The composition in accordance with claim 7 in which the aminoxysilicon compound is present in an amount of from 1 to 2 parts by weight.

12. A composition which is stable under anhydrous conditions but curable at room temperature upon exposure to moisture to a silicone elastomer consisting essentially of (A) 100 parts by weight of a hydroxyl endblocked polydiorganosiloxane having a viscosity at 25° C. of from 70 to 50,000 cs. and in which the organic groups are selected from the group consisting of methyl, ethyl, vinyl, phenyl and 3,3,3-trifluoropropyl radicals, in said polydiorganosiloxane no more than 50 percent of the organic groups being phenyl or 3,3,3-trifluoropropyl radicals and no more than 10 percent of the organic groups being vinyl radicals, (B) 0 to 150 parts by weight of a non-acidic, non-reinforcing filler, (C) 5 to 20 parts by weight of a silane of the general formula

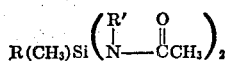

in which R is an organic radical selected from the group consisting of methyl, vinyl and phenyl and R' is an organic radical selected from the group consisting of methyl, ethyl and phenyl, said silane being present in an amount sufficient to provide at least one silane molecule per one hydroxyl of the polydiorganosiloxane, (D) 0.25 to 7 parts by weight of an aminoxysilicon compound having from 1 to 100 silicon atoms per molecule and from 3 to 10 aminoxy groups per molecule, said aminoxy group having a general formula —OX in which X is a monovalent amine radical selected from the group consisting of —NR"$_2$ and a heterocyclic amine, R" is a monovalent hydrocarbon radical, the —OX group being bonded to silicon atoms through an Si—O bond, the remaining valences of the silicon atoms in the aminoxysilicon compound being satisfied by divalent oxygen atoms which link the silicon atoms of the aminoxysilicon compounds having two or more silicon atoms per molecule through silicon-oxygen-silicon bonds and by monovalent hydrocarbon radicals and halogenated monovalent hydrocarbon radicals bonded to the silicon atoms through silicon-carbon bonds, there being an average of at least one monovalent hydrocarbon radical or halogenated monovalent hydrocarbon radical per silicon atom, said aminoxysilicon compound being present in an amount which is not greater than the weight of the silane (C), the amount of said aminoxysilicon compound in said composition does not exceed 3 parts by weight per 100 parts of polydiorganosiloxane wherein the viscosity of said polydiorganosiloxane at 25° C. is 8,000 cs. or less.

13. The composition in accordance with claim 12 in which the polydiorganosiloxane is a polydimethylsiloxane, R is vinyl, R' is methyl and each R" is ethyl.

14. The composition in accordance with claim 13 in which the non-acidic, non-reinforcing filler is present in an amount of from 10 to 125 parts by weight.

15. The composition in accordance with claim 14 in which the viscosity of the polydimethylsiloxane is from 1,000 to 15,000 cs. at 25° C.

16. The composition in accordance with claim 15 in which the silane (C) is present in an amount of from 6 to 9 inclusive parts by weight.

17. The composition in accordance with claim 16 in which the non-acidic, non-reinforcing filler is calcium carbonate.

18. The composition in accordance with claim 17 in which the aminoxysilicon compound is a linear copolymer having an average of 5 to 15 silicon atoms per molecule and having siloxane units selected from the group consisting of trimethylsiloxane units, dimethyl-(N,N-diethylaminoxy)siloxane units, methyl-(N,N - diethylaminoxy)siloxane units and dimethylsiloxane units.

19. The composition in accordance with claim 17 in which the aminoxysilicon compound is methyltri-(N,N-diethylaminoxy)silane.

20. The composition in accordance with claim 17 in which the aminoxysilicon compound is a cyclic siloxane consisting of one unit of methyloctylsiloxane and three units of methyl-(N,N-diethylaminoxy)siloxane.

21. The composition in accordance with claim 17 in which the aminoxysilicon compound is present in an amount of from 1 to 2 parts by weight.

References Cited
UNITED STATES PATENTS

| | | | |
|---|---|---|---|
| 3,719,632 | 3/1973 | Lengnick | 260—37 SB X |
| 3,429,847 | 2/1969 | Boissieras et al. | 260—37 SB |
| 3,359,237 | 12/1967 | Boissieras et al. | 260—37 SB X |

LEWIS T. JACOBS, Primary Examiner